United States Patent Office 2,949,417
Patented Aug. 16, 1960

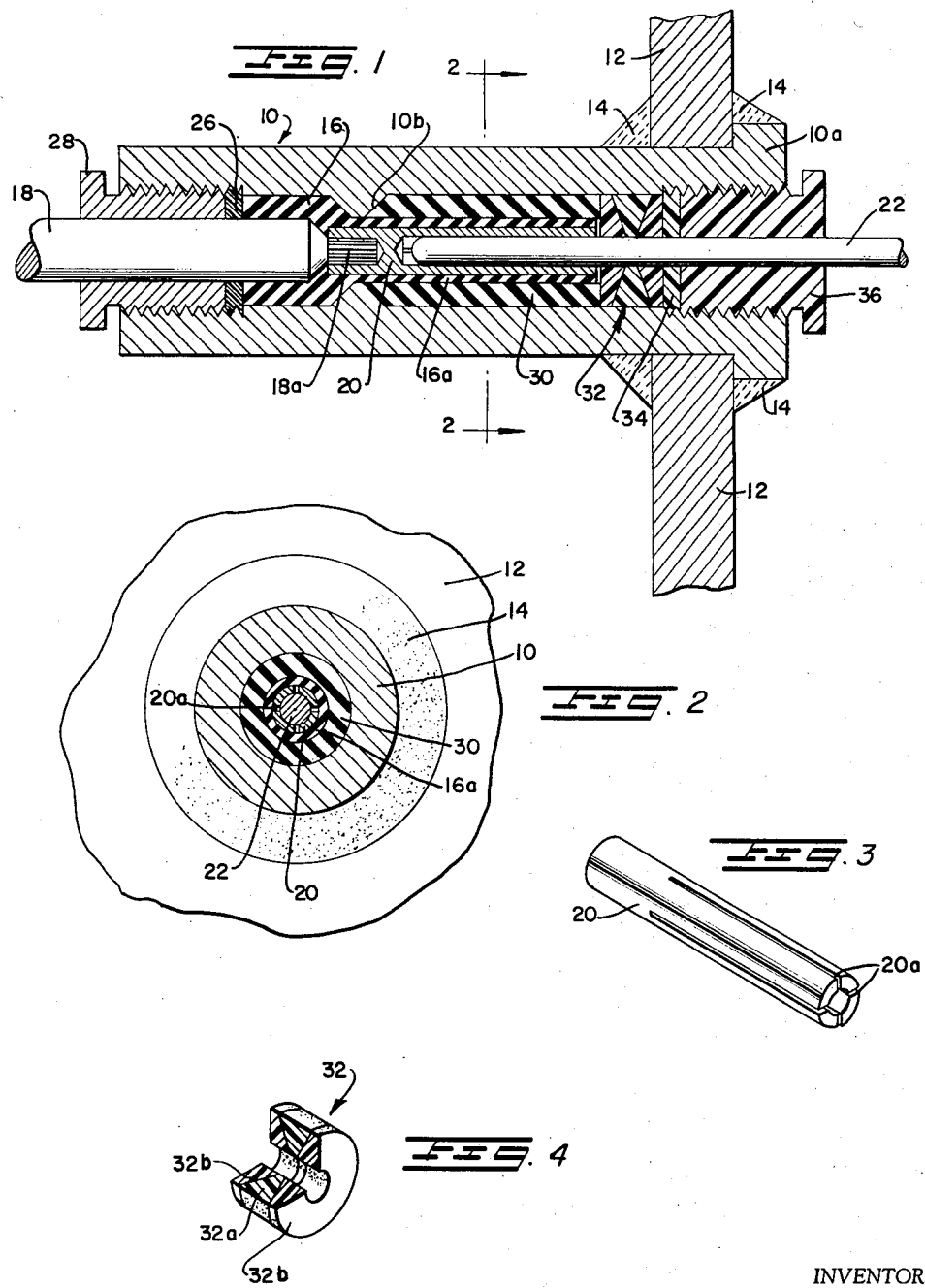

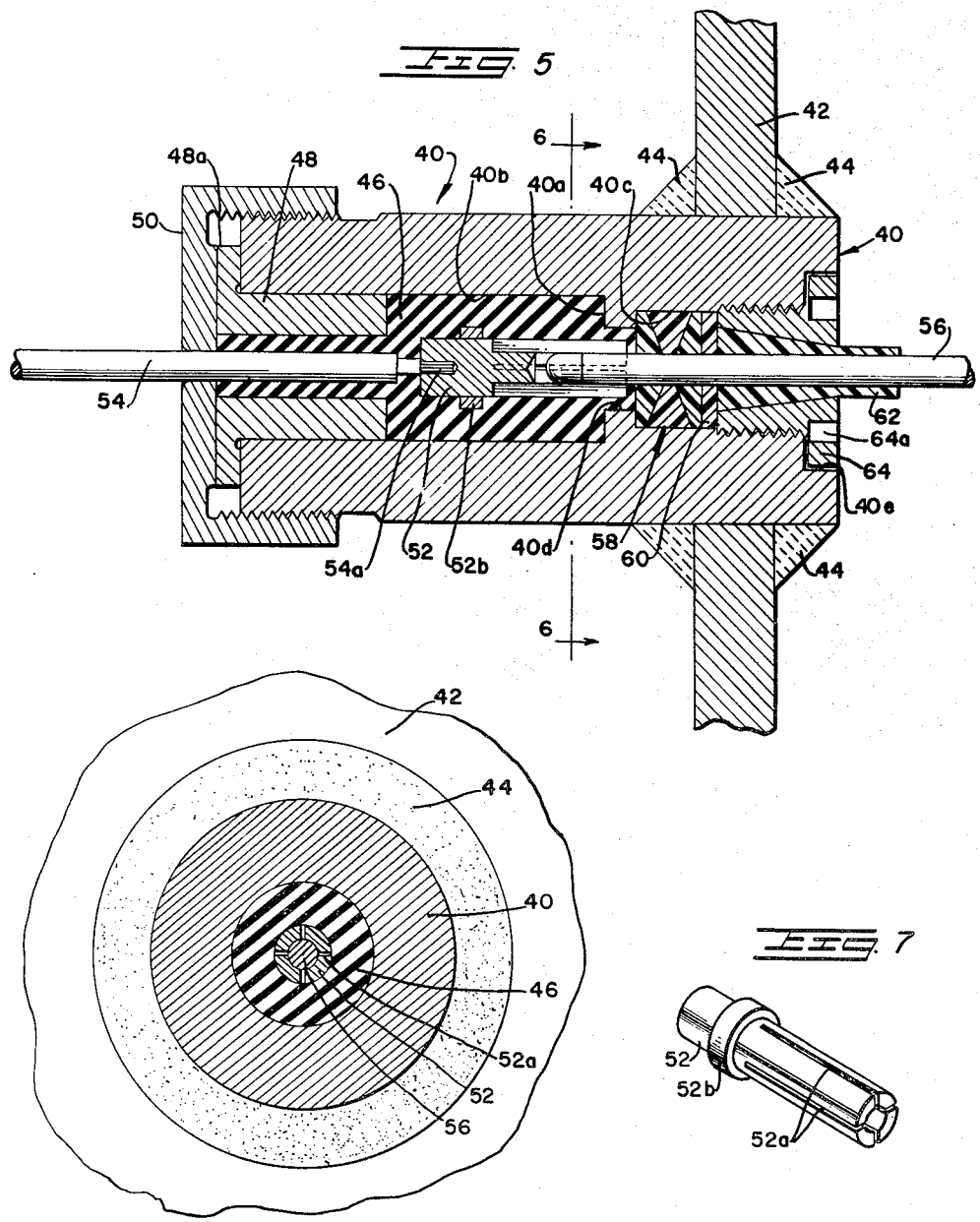

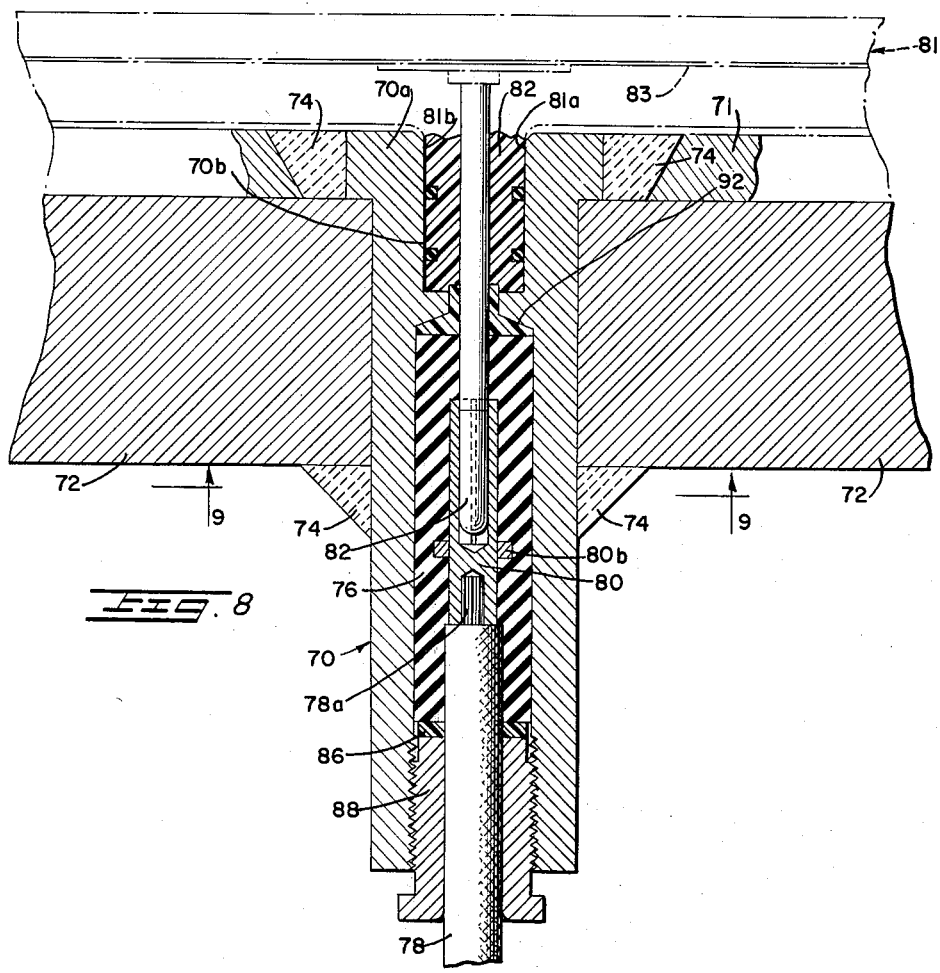
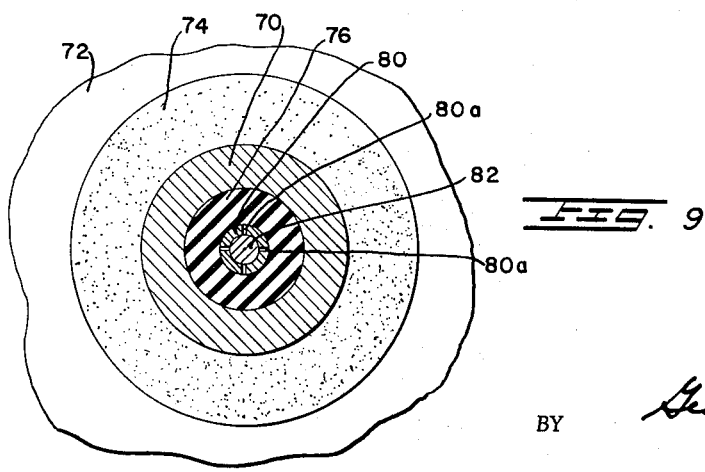

2,949,417

ELECTRICAL CONNECTION FOR CATHODIC PROTECTION

Herman S. Preiser, North Springfield, Va., and Fredrick L. Downs, Rye Beach, N.H.

Filed July 31, 1957, Ser. No. 675,503

4 Claims. (Cl. 204—196)

(Granted under Title 35, U.S. Code (1952), sec. 266)

The invention described herein may be manufactured and used by or for the Government of the United States of America for governmental purposes without the payment of any royalties thereon or therefor.

This invention relates generally to stuffing tubes and particularly to pressure and fluid tight stuffing tubes.

More particularly, this invention relates to stuffing tubes for use with impressed current cathodic protection systems wherein an anode, located below the water line on the exterior of a ship, submarine or other vessel, is connected to a current source located within the vessel.

While not so limited, the stuffing tubes of the instant invention are particularly adapted for use with impressed current cathodic protection systems and anode holders therefor as disclosed and claimed in the copending patent application of Herman S. Preiser et al., Serial No. 631,377, filed December 28, 1956, and now Patent No. 2,910,419, for Energized Anode Holder Assembly, wherein the applicant Preiser is the same joint inventor as in the instant applicant.

Whenever an electrical cabel penetrates the hull or a watertight bulkhead of a ship or submarine, it is necessary to provide a watertight, pressureproof stuffing tube through which the cable passes. The Navy has had considerable experience with stuffing tubes of numerous types, and standards exist for their construction and installation.

Prior to the instant invention, a standard method of making the connection between an anode on the exterior of a vessel and a current source within the vessel was to solder an electrical lead to the anode rod and then mold a rubber seal around the juncture. The molded rubber assembly was then fitted into a standard stuffing tube. The molded seal performed two functions: One was to seal the electrical connection from water seepage; and the other was to seal the hull penetration to prevent water leakage into the ship.

The old method was unreliable for at least three reasons:

(a) The neoprene rubber seal was affected by electrochemical deterioration products produced by the anode. This allows water seepage into the electrical junction which ultimately destroyed continuity of the circuit. Also, the rubber seal lost some of its resilience and therefore would eventually breakdown as a packing which would permit water leakage into the ship. This is especially dangerous in the case of submarines. Also, it was exceedingly difficult to obtain an intimate bond between the rubber and a platinum-clad anode rod;

(b) The soldered connection within the seal did not permit easy assembly of the anode on the hull of the ship. Also dismantling the anode for inspection and repair could not be accomplished readily without destroying the seal; and (c) The metal gland nut for tightening the rubber seal within the stuffing was susceptible to shorting against the anode which would render the system inoperative. Also the presence of bare metal in the vicinity of the anode would cause large amounts of current to accumulate there and therefore prevent some of the current from flowing to the hull where it is needed.

A broad object of the present invention is to overcome inherent defects in prior stuffing tubes.

Another broad object of the present invention is to provide an improved method of connecting an anode located on the exterior of a vessel to a source of current within the vessel.

Another object of this invention is to provide a waterproof, pressureproof stuffing tube.

Another object of this invention is to provide a chemically resistant stuffing tube.

A more specific object of this invention is to provide a waterproof, pressureproof electrical connection for an anode rod passing through the hull of a ship or submarine.

Another specific object of this invention is to provide a stuffing tube which allows for easy making and breaking an electrical connection without disturbing a waterproof, pressureproof packing.

Another specific object of the present invention is to provide a stuffing tube for an electrical connection in an impressed current cathodic protection system wherein the anode or electrode of such system can be dismantled readily without disturbing the electrical connection.

Briefly, in accordance with the present invention, the disadvantages of the old methods are eliminated, and the objects of the instant invention are attained by a number of changes and additions. Firstly, deterioration of the rubber seal by the anode is prevented by incorporating a special chemically resistant packing in the stuffing tube, which packing is positioned in front of or on the water side of the rubber seal. The rubber seal is retained to provide water-tightness through the hull. The special rubber-protective packing is made of tetrafluoroethylene (Teflon) with a cup and cone or chevron formation. When compressed by the gland nut, the packing expands against the anode rod and the inner surfaces of the stuffing tube, creating a watertight, chemically resistant seal. In certain embodiments of the invention the outer or water-exposed gland nut is made of suitable plastic materials such as glass-reinforced polyester resin, and in other embodiments, where the gland nut is of metal, a tapered Teflon piece, machined or molded to size is inserted within the gland nut and extends beyond the outer or exposed surface of the gland nut.

Secondly, the plastic gland nut, and/or the tapered plastic piece inserted in the gland nut, prevents the anode rod from short-circuiting against the nut. Where a metallic gland nut is used it is coated with a polyester, ceramic or other coating to prevent current or reaction product residue accumulation near the metal. As stated hereinbefore, the rubber seal is retained, however, it was found by experiment that a blend of polyvinyl chloride and acrylonitrile rubber is preferred for the molded section of the rubber seal as it has excellent resistance to oxy-chloride (anode reaction product) attack.

Thirdly, a special disconnect feature is incorporated in the seal which permits the cable to be made up, sealed and positioned in the stuffing tube in advance of anode assembly. The anode merely plugs into a female connector molded directly into the rubber section of the stuffing tube assembly, and the anode can be dismantled without disturbing the electrical connection.

Other objects and many of the attendant advantages of this invention will be readily appreciated as the same becomes better understood by reference to the following detailed description when considered in connection with the accompanying drawings in which like reference numerals designate like parts throughout the several views thereof and wherein:

Fig. 1 is a longitudinal sectional view through a stuffing tube incorporating a first embodiment of this invention;

Fig. 2 is a transverse sectional view taken on line 2—2 of Fig. 1;

Fig. 3 is a perspective view of a cable and anode connector shown in section in Fig. 1;

Fig. 4 is a perspective view, partly in section, of a cup and cone packing shown in section in Fig. 1;

Fig. 5 is a longitudinal sectional view, generally similar to Fig. 1, showing a second embodiment of stuffing tube in accordance with the present invention;

Fig. 6 is a transverse sectional view taken on line 6—6 of Fig. 5;

Fig. 7 is a perspective view, similar to Fig. 3, illustrating a modified connector;

Fig. 8 is a longitudinal sectional view through a third embodiment of stuffing tube in accordance with this invention; and Fig. 9 is a transverse sectional view taken on line 9—9 of Fig. 8.

Referring now to the drawings, first to Fig. 1. In this embodiment of the invention, the stuffing tube and cable seal comprises a tubular body member 10 that penetrates the hull or shell 12 of a vessel and is permanently welded thereto as at 14. The body member is formed of steel with an outer flange 10a and with an inner V-shaped annular flange 10b. The outer flange abuts the outside surface of the hull and the inner flange forms an abutment for retaining the packing members, to be referred to hereinafter, and the inner flange partially separates an inner and an outer bore in the body member, which bores receive the packing members.

A molded rubber packing 16 fits within the inner bore of member 10 for the reception of a current-carrying cable 18, the wire of which cable is exposed at 18a for attachment of a connector 20 by soldering or mechanical means. Connector 20 preferably is made of Phosphor bronze or tantalum, which latter material prevents electrochemical deterioration of the cable conductor in the event of accidental damage to the anode, and is formed with oppositely-directed bores, with the inner bore receiving the stripped end 18a of the cable and the outer bore detachably receiving the inner end of an anode rod 22. As shown, the outer bore of the connector is much longer than the inner bore and this portion of the connector is provided with longitudinal slots 20a (Fig. 3), which provide a resilient fit with the inner end of the anode rod. The anode rod, which is connected to and forms a part of an anode, not shown, is made of platinum-clad or tantalum-clad silver.

The inner end of cable 18, with the connector 20 more or less permanently attached thereto, is embedded in the molded rubber packing 16. The rubber packing 16 preferably is formed of a blend of polyvinyl chloride and acrylonitrile rubber. A gland ring 26, made of brass or like material, surrounds the cable and fits between the inner end of packing member 16 and the outer end of a gland nut 28, which gland nut is screw threaded into the inner end of body member 10. Since gland nut 28 is located on the inside of the hull it may be made of brass or like material. Packing member 16 is formed with an elongated, reduced diameter portion 16a that surrounds connector 20 and is in turn surrounded by a rubber grommet 30. The inner end of the grommet is formed with a sharp taper that abuts the outer side of the V-shaped flange 10b of the body member. The packing member 16 is likewise provided with a sharp taper that abuts the inner side of the V-shaped flange.

A cup and cone packing 32, that is, one with sloped surfaces in contact, fits within the outer bore of body member 10 and surrounds the anode rod. This packing, which is made of Teflon or similar dielectric and chemically resistant material, includes a center, oppositely cupped disk 32a and two oppositely faced conical members 32b. A Teflon packing disk 34 abuts the outer conical member and a gland nut 36 is screw threaded into the outer end of member 10. The gland nut 36, which is exposed to sea water and also to the electric current carried by the anode rod, is preferably formed of glass-reinforced, polyester resin.

In mounting and assembling the Fig. 1 embodiment of the invention on the hull of a surface vessel or a submarine or the like, the steel body member 10 is located within a suitable opening in the hull or pressure shell and is permanently attached thereto by the welds 14. Then the outer end of cable 18 is prepared by stripping off a necessary length of cable sheathing and insulation, exposing the end of the cable wire at 18a and the inner end of connector 20 is attached to the stripped end of the wire by soldering or mechanical means. The gland nut 28 and gland ring 26 are then placed on the end of the cable. Then the rubber packing 16 is molded about the end of the cable and about the entire length of the connector 20; leaving only the outer end of the connector exposed for reception of the anode rod. Thus the end of the cable and the connector are embedded within and insulated and waterproofed by the rubber packing 16. This subassembly of cable end, connector and rubber packing is inserted into the inner bore of body member 10 with the sharp taper of the rubber packing 16 abutting the inner face of flange 10b which limits outer movement of the subassembly relative to the body member. Then the gland nut 28, with gland ring 26 in front of it is threaded into the body member and tightened as necessary. The tightening of gland nut 28 expands the rubber packing against the interior surfaces of the body member creating the desired seal.

The rubber grommet 30 is then inserted into the opposite end of body member 10 until the sharp taper of the grommet abuts the outer surface of flange 10b. The cup and cone packing 32 and the packing disk 34 are inserted into the body member and the anode rod 22 with gland nut 36 loosely fitted thereon is inserted into the body member with an appreciable length of the rod fitted into the outer bore of connector 20 and resiliently held therein by the slotted formation 20a of the connector. Gland nut 36 is then threaded into the outer end of member 10, and is tightened as necessary to bring the several packing members home, with the anode rod now securely but removably attached to the connector 20, and through the connector to the cable 18.

The tightening of gland nut 36 forces the inner packing 32b (Fig. 4) against the outer end of grommet 30, resulting in expansion of the grommet against the inner surfaces of the body member and against the outer surface of portion 16a of the rubber packing, which in turn forms a waterproof, pressureproof seal and tightens the end of the anode rod in the connector. The tightening of gland nut 36 also expands the cup and cone packing 32 and packing disk 34 against the anode rod and inner surface of the stuffing tube, creating a watertight, chemically resistant seal.

Thus the rubber packing members that provide a pressureproof electrical connection and waterproof and insulate the end of the cable, the connector and the inner end of the anode rod are themselves protected against possible exposure to sea water by the dielectric, chemically inert cup and cone packing 32, the packing disk 34 and the gland nut 36. As shown in Fig. 1, the gland nut 36, which is made of dielectric, chemically resistant material, extends beyond the outer surface of the body member 10 in a manner as to prevent short circuiting of the anode rod and flow of stray currents therefrom.

In the Fig. 5 embodiment of the invention the stuffing tube and cable seal is particularly adapted for use with pressure hulls of deep diving submarines or the like. Here the stuffing tube includes a tubular body member 40 that penetrates the hull or shell 42 of the vessel and is permanently welded thereto, as at 44. The body member is formed of high tensile steel and is provided with an internal annular flange 40a that separates two axial bores 40b and 40c. A third axial bore 40d is formed by the inner cylindrical surface of flange 40a, and a fourth axial bore 40e is formed in the outer end of member 40 and forms an enlarged continuation of bore 40c.

A molded cylindrical rubber packing 46 is located within the bore 40b and has an outer reduced diameter end in bore 40d and an inner reduced diameter end for the reception of a compression collar 48, which collar is formed of manganese bronze and has a flange 48a that abuts the inner end of body member 40. Collar 48 is held in place by a hexagonal nut 50, made of manganese bronze and screw threaded onto the inner end of member 40. A connector 52 is embedded within the rubber packing 46 and is provided with an enlarged diameter portion 52b that prevents longitudinal movement of the connector relative to the rubber packing. The connector, as in the Fig. 1 embodiment, is made of Phosphor bronze and is formed with a first or inner axial bore for the reception of a stripped wire 54a of a cable 54, and with a second or outer axial bore for the reception of an anode rod 56. The wire 54a is permanently secured to the connector, while the anode rod 56 is releasably held in the connector by a resilient fit, as by longitudinal slots 52a (Fig. 7) formed in the connector.

A cup and cone packing 58, a packing disk 60, a packing tube 62 and a gland nut 64, each made of Teflon or other suitable dielectric and chemically resistant material, fit within the bore 40c of the body member and surround the anode rod. As shown, the packing tube 62 and the gland nut 64 are formed with mating conical surfaces, and the gland nut is formed with spaced openings 64a in a flange portion thereof for the reception of a spanner wrench, not shown, for tightening the nut in the threaded, outer end of body member 40.

The mounting and assembling of the Fig. 5 embodiment of the invention is generally similar to that of the Fig. 1 embodiment. That is, the body member 40 is located within a suitable opening in the hull or pressure shell 42 and is permanently attached thereto by the welds 44. The nut 50 and collar 48 are then placed on the end of the cable. Then the outer end of cable 54 is stripped of a desired length of sheathing and insulation so as to expose a length of wire, which wire is shown at 54a and the inner end of connector 52 is more or less permanently attached to this exposed end of the wire. Then the rubber packing 46 is molded about the end of the cable and about the entire surface of the connector 52; leaving only the outer end of the connector exposed for the reception of the anode rod 56. Thus the end of the cable and the connector are embedded within and insulated and waterproofed by the rubber packing 46.

This subassembly of cable end, connector and rubber packing is inserted into the inner end of body member 40 until the outer end of the largest cylindrical portion of the rubber packing abuts the inner surface of flange 40a formed in body member 40. Collar 48 is then located within the bore of the body member with the flange portion 48a thereof abutting the inner end of the body member. The gland nut 50 is then threaded onto the inner end of the body member and tightened as necessary.

The cup and cone packing 58 and packing disk 60 are now inserted into the bore 40c of the body member, with the inner side of packing 58 abutting the outer surface of the rubber packing 46 and of flange 40a. The anode rod 56, with packing tube 62 and gland nut 64 loosely applied thereon, is inserted into the outer end of the body member with an appreciable length of the rod fitted into the outer bore of the connector 52 and resiliently-held therein by the slotted formation 52a thereof. Then the packing tube 62 is properly located against packing disk 60 and the gland nut 64 is threaded into the body member and tightened as necessary to bring the several packing members home, with the anode rod now securely but removably attached to the connector and, through the connector, to the cable. Thus in the Fig. 5 embodiment, as in the Fig. 1 embodiment, the rubber packing which provides a pressureproof electrical connection and waterproofs and insulates the outer end of the cable, the connector and the inner end of the anode rod, is itself protected against possible exposure to sea water by the dielectric, chemically inert cup and cone packing, packing disk, packing tube and outer gland nut. As shown in Fig. 5, the outer end of packing tube 62, which tube is formed of dielectric, chemically resistant material, extends beyond the outer surface of body member 40 in a manner as to prevent short circuiting of the anode rod and flow of stray currents therefrom.

The stuffing tube and cable seal shown in Figs. 8 and 9 is particularly adapted for use with an anode holder of the type shown in Figs. 27 and 28 of copending application Serial No. 631,377, referred to above. In this embodiment of the invention, the stuffing tube and cable seal comprises a tubular body member 70 that penetrates the hull or shell 72 of a vessel and is permanently welded thereto as at 74. The body member is formed of steel with an outer flange 70a and with an inner annular flange 70b. The outer flange abuts the outside surface of the hull and the inner flange partially separates an inner and an outer bore in the body member, with the inner bore receiving the packing member to be referred to hereinafter, and the outer bore receiving a shank 81a of a plastic anode or reference electrode holder 81, which holder is shown only in phantom. A pair of rubber O-rings 81b seals the shank in the outer bore.

A molded rubber packing 76 fits within the inner bore of member 70 for the reception of a current-carrying cable 78, the wire of which cable is stripped at 78a for attachment of a connector 80. Connector 80 preferably is made of Phosphor bronze or tantalum and is formed with oppositely-directed bores, with the inner bore receiving the stripped end 78a of the cable and the outer bore detachably receiving the inner end of an anode or reference electrode rod 82. As shown, the outer bore of the connector is much longer than the inner bore and this portion of the connector is provided with longitudinal slots 80a (Fig. 9) which provide a resilient fit with the inner end of the anode rod. The anode rod, which is connected to and forms a part of an anode 83 is made of platinum-clad silver. A silver rod would be used for a reference electrode rod.

The inner end of cable 78, with the connector 80 more or less permanently attached thereto, is embedded in the molded rubber packing 76. The rubber packing 76 preferably is formed of a blend of polyvinyl chloride and acrylonitrile rubber. A gland 86, made of brass or like material, surrounds the cable and fits between the inner end of packing member 76 and the outer end of a gland nut 88, which gland nut is screw threaded into the inner end of body member 70. Since gland nut 88 is located on the inside of the hull it may be made of brass or like material. A cone packing member 92 fits within the inner bore of body member 70, surrounds the anode rod and seals the opening in flange 70b. Packing 92 is made of Teflon or similar dielectric and chemically resistant material.

In mounting and assemblying the Fig. 8 embodiment of the invention on the hull of a vessel, the steel body member 70 is located within a suitable opening in the hull or pressure shell and is permanently attached thereto and to a sole plate 71 by the welds 74. The gland nut 88 and gland ring 86 are placed on the end of the cable. Then the outer end of cable 78 is prepared by stripping off a necessary length of cable sheathing and insulation at the end of the cable wire 78a and the inner end of connector 80 is more or less permanently attached to the wire. Then the rubber packing 76 is molded about the end of the cable and about the entire length of the connector 80; leaving only the inside of the outer end of the connector exposed for reception of the anode rod. Thus the end of the cable and the connector are embedded within and insulated and waterproofed by the rubber packing. The packing 92 is then inserted in the opening in flange 70b of the body member with the conical portion of the packing abutting the cupped portion of flange 70b. Then the subassembly of cable end, connector and rubber packing is inserted into the inner bore of body member 70 with the butt end of the rubber packing abutting the inner face of packing 92 which limits outer movement of the subassembly relative to the body member. Then the gland nut 88 with gland ring 86 in front of it is threaded into the body member and tightened as necessary. The ring portion 80b of the connector prevents movement of the connector relative to the rubber packing 76. The shank portion 81a of the anode holder is then inserted into the outer bore of body member 70 and the anode rod 82 carried by the holder is inserted into the connector 80 and resiliently held therein by the slotted portion of the connector. Thus the rubber packing member that provides a pressureproof electrical connection and waterproofs and insulates the end of the cable, the connector and the inner end of the anode rod, is protected against possible exposure to sea water by the dielectric, chemically inert O-rings 81b and cone packing 92. For the purpose of providing additional sealing surface for the anode rod, or the electrode rod, the Fig. 8 embodiment shows the connector 80 embedded to a greater extent in the molded rubber packing 76. It should also be noted, in this embodiment, the complete sealing of the conductors and connector within the stuffing tube is accomplished by tightening a single gland nut 88.

Thus it is seen, in each of the illustrated embodiments of the invention, a subassembly of cable end, connector and molded rubber seal is insertable into and removable from a stuffing tube as a unit; the molded rubber forms a waterproof, pressureproof electrical connection through a hull or like shell of a ship, submarine or the like; the rubber seal is protected against the harmful effects of sea water by a dielectric, chemically resistant packing; a special disconnect feature is incorporated in the seal which permits the subassembly to be made up, sealed and positioned in the stuffing tube in advance of anode assembly; the anode or electrode rod merely plugs into the connector, and the anode can be dismantled without disturbing the electrical connection; and the anode rod is protected against short circuiting in the vicinity of the stuffing tube.

It should be understood, of course, that the foregoing disclosure relates to only preferred embodiments of the invention and that numerous modifications or alterations may be made therein without departing from the spirit and the scope of the invention as set forth in the appended claims.

What is claimed is:
1. In combination with the hull of a ship, a waterproof, pressureproof, and chemically resistant electrical connection for use with an impressed current cathodic protection system for the ship, the electrical connection passing through the hull of the ship, said electrical connection comprising a continuous tubular outer body member penetrating said hull and attached thereto, said tubular member having a radially extending flange spaced from the ends thereof, a first electrical conductor on the inward side of said hull, a bare second electrical conductor extending to the outer side of said hull and adapted to be connected to an anode located outside of said hull in contact with sea water electrolyte, said first conductor having a bared tip, a cylindrical electric connector having an end wall portion defining an inward hole receiving said bared tip, and having a slotted wall portion defining an outward hole for frictionally resiliently receiving an end of said second conductor, said connector being axially spaced from said flange, a rubber seal molded about said connector with said bared tip therein and a contiguous portion of said first conductor, thereby making an integral sub-assembly, said rubber seal completely covering the outside of said connector and said contiguous portion of said first conductor, said sub-assembly being slidable into and out of said tubular member through its inward end, an oxychloride-resistant tapered packing grommet between said molded rubber seal and said flange, a gland nut in threaded engagement with said tubular member for pressing said rubber seal against said grommet and said tubular member, and pressing said slotted wall of said connector against said second conductor, and an electricity insulating means including a packing between said tubular member and a portion of said second conductor, for holding said second conductor insulated from said tubular member, said insulating means being on the outward side of said inner flange.

2. An invention as defined in claim 1 wherein said insulating means comprises an O-ring sealing means in engagement with said tubular member on the outward end thereof.

3. An invention as defined in claim 1 wherein said rubber seal comprises a blend of polyvinyl chloride and acrylonitrile rubber.

4. An invention as defined in claim 3 wherein said grommet comprises a disc of tetrafluoroethylene.

References Cited in the file of this patent

UNITED STATES PATENTS

| 194,666 | Field | Aug. 28, 1877 |
| 1,731,597 | Spear | Oct. 15, 1929 |
| 2,422,379 | Westman | June 17, 1947 |
| 2,552,686 | Melcher | May 15, 1951 |
| 2,642,474 | Bowar | June 16, 1953 |
| 2,658,052 | Signer et al. | Nov. 3, 1953 |

FOREIGN PATENTS

| 495,401 | Canada | Aug. 18, 1953 |